July 9, 1929.  H. S. JANDUS  1,720,599
VEHICLE BUMPER
Filed Aug. 12, 1927    2 Sheets-Sheet 1
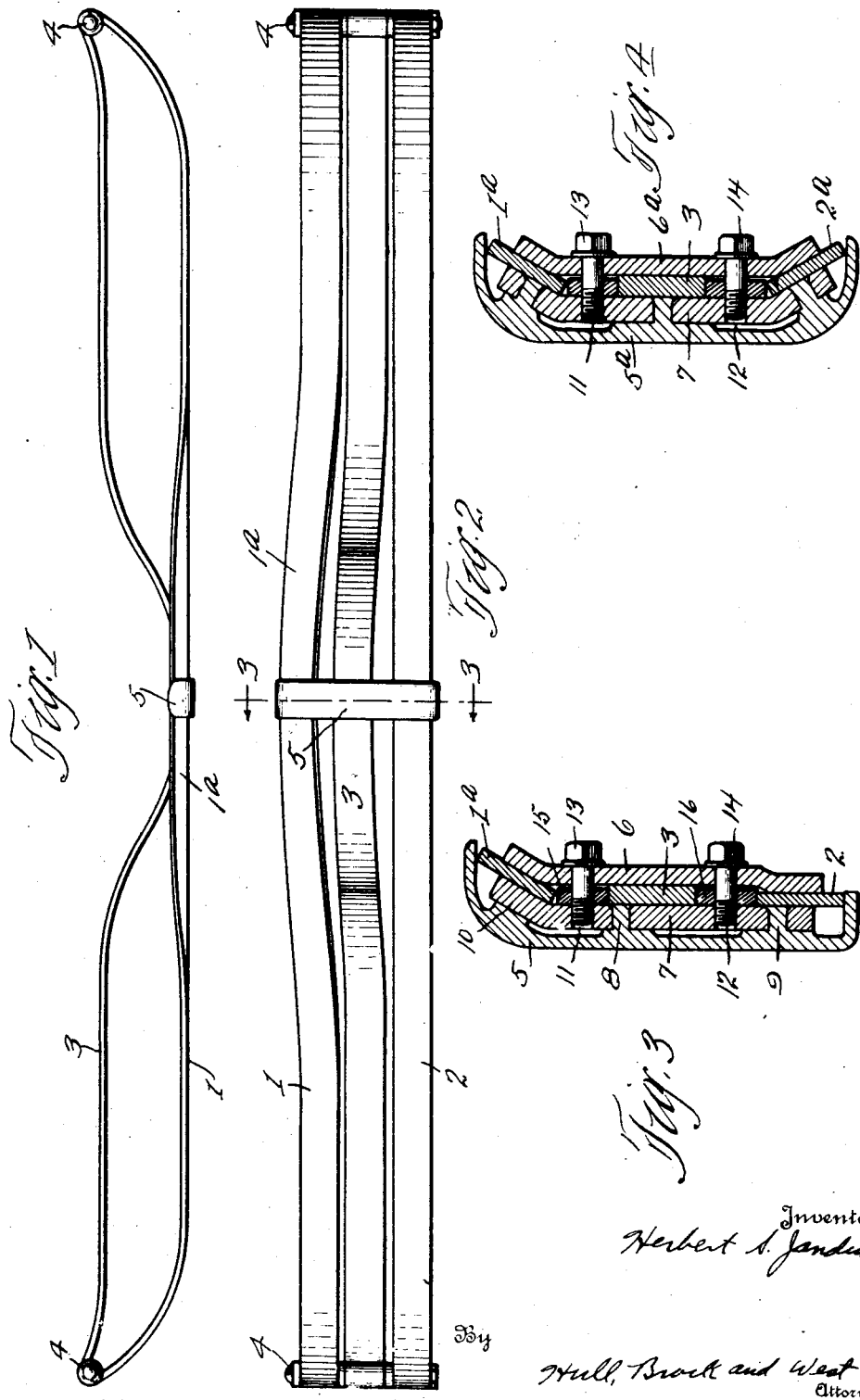

July 9, 1929.  H. S. JANDUS  1,720,599
VEHICLE BUMPER
Filed Aug. 12, 1927   2 Sheets-Sheet 2
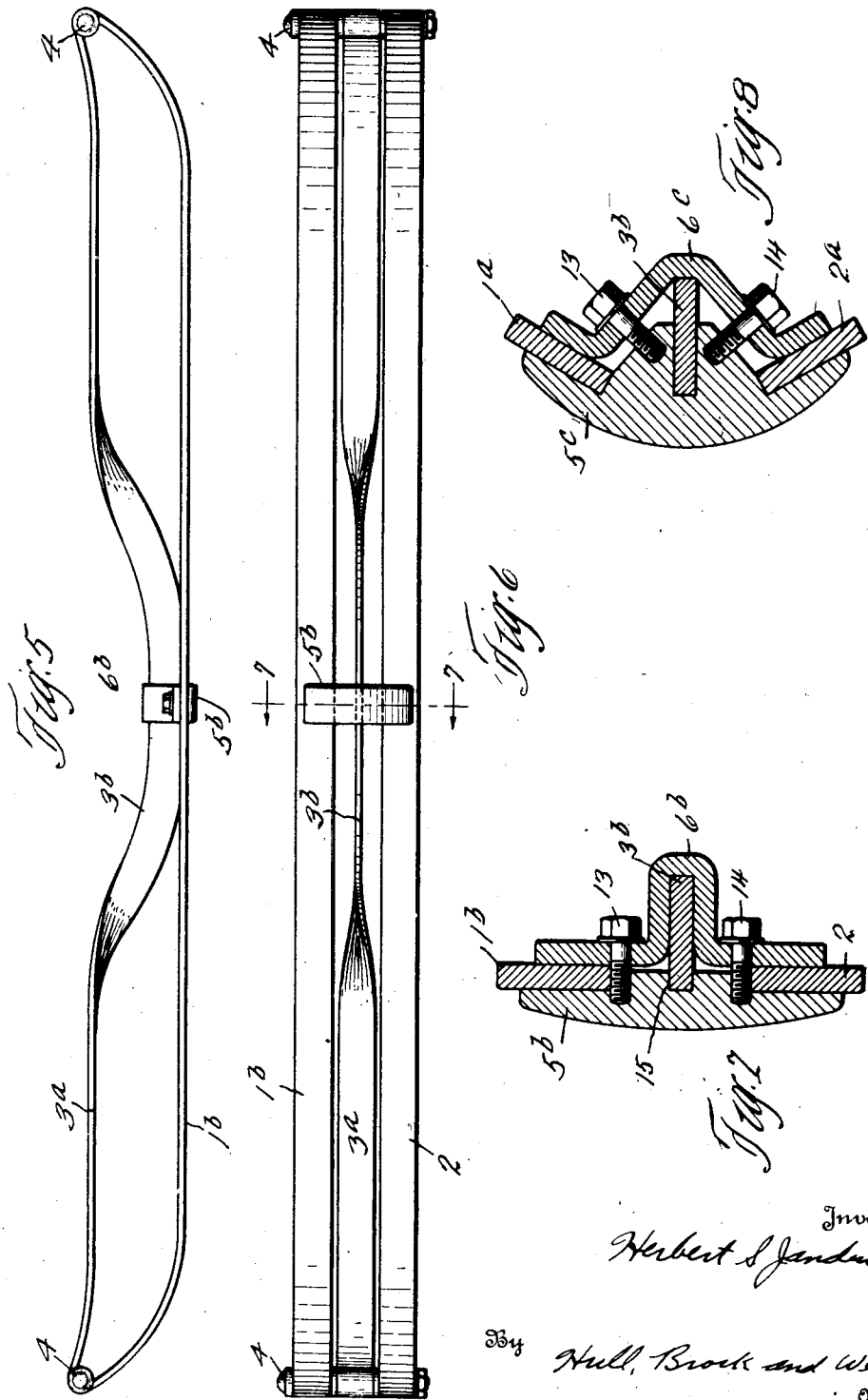

Patented July 9, 1929.

1,720,599

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

VEHICLE BUMPER.

Application filed August 12, 1927. Serial No. 212,378.

This invention relates to vehicle bumpers and has for an object the provision of a bumper offering increased resistance to a blow directed toward the central portion of the impact members. A further object is to provide a bumper having a pivoted end structure together with increased strength at the central impact section. Another object of the invention is to provide a bumper which may be narrowed, and at the same time of increased rigidity, at the central portion. A further object is to provide such a bumper which will also present an attractive appearance.

Further objects and advantages will be apparent from the following description and the drawings and from the use of the articles defined by the claims.

In the drawings Fig. 1 represents a plan view of my bumper; Fig. 2 represents a front elevation; Fig. 3 represents a sectional view taken on the line 3—3 of Fig. 2; Fig. 4 represents a sectional view, similar to Fig. 3, of a modification of my invention; Fig. 5 represents a plan view of a further modified form of my bumper; Fig. 6 is a front elevation of the bumper shown in Fig. 5; Fig. 7 is a sectional view taken on the line 7—7 of Fig. 6; Fig. 8 is a view similar to Fig. 7 of another modified form of my invention.

In describing the bumper I will assume it to be attached to the front of a vehicle and the terms "front" and "rear" will be used in view of this assumption, but it is not intended in so doing to restrict the use of my bumper to any particular portion of the vehicle.

Of the reference characters appearing on the several figures 1 and 2 denote the impact bars of a bumper of the general type shown in McGregor Patent No. 1,372,154 issued March 22, 1921. The impact bars are pivotally connected at their ends to the ends of the rear bar 3 by means of bolts 4, 4 passing through eyes at the ends of the impact and rear bars. The central portion of the rear bar 3 is bent forwardly for attachment to the central portion of the impact section and is connected thereto by means of a clamp made up of a front plate 5 and a rear plate 6.

The central portion $1^a$ of the impact bar 1 is twisted so that the upper edge thereof is in a plane spaced rearwardly from the lower edge, which latter is preferably maintained in the plane of the lower impact bar 2. By this arrangement the central portion of the impact bar 1 will be placed in a plane inclined to the vertical while the eyes at the end thereof will extend in a substantially vertical direction.

The center clamp I have shown for use with this bumper is made up of a plate 5, which may be of any suitable material and shape, a plate 7 which is preferably inlaid in said plate 5 and is rigidly fastened thereto by means of studs 8 and 9 integral with said plate 5. The upper portion of the plate 7 is bent rearwardly as at 10 and so adapted to bear upon the front surface of the twisted portion $1^a$ of the impact bar 1, while the central and lower portions are adapted to bear upon the front surfaces of bars 3 and 2, respectively. Threaded apertures 11 and 12 are provided in plate 7 for the reception of the shanks of bolts 13 and 14. The rear clamp plate 6 is bent at its end portions to provide bearing surfaces against the rear surface of the portion $1^a$ of the impact bar 1 and the rear surfaces of the impact bar 2 and the rear bar 3. The spacers 15 and 16 are placed between the edges of the bars 1 and 3 and the bars 2 and 3, respectively, in order to hold them in proper spaced relation. These spacers may, of course, be made integral with the plate 5, or the plate 7, if such construction is desired, and it is apparent that any suitable form of clamp may be substituted for the clamps herein described.

The central portion of the impact bar 1 will be stiffened by the means herein disclosed since the effective thickness of the bar will be increased by the angular displacement. By the use of my invention the resistance to torsional stress will be added to the resistance to bending which is offered by a bar in a vertical plane when a blow is struck thereupon.

It is apparent that if desired my invention might also be utilized in the lower impact bar. In Fig. 4 such a modification has been shown. In this modification the impact bar 2 is replaced by a twisted impact bar $2^a$ and the clamp plates 5 and 6 are replaced by suitably bent clamp plates $5^a$ and $6^a$ which are adapted to bear upon the corresponding surfaces of the impact and rear bars.

It is further apparent that my invention might be applied to the rear bar, as shown in Figs. 5–8. In the modifications shown in Figs. 5–7 the back bar 3 is replaced by a back bar 3ª which has a portion 3ᵇ twisted to such an extent that it lies in a horizontal plane. If desired the portion 3ᵇ might be twisted to a lesser degree and any angle might be used to get the effect desired. With the back bar so twisted the center clamp more clearly shown in Fig. 7 may be used. This clamp consists of a plate 5ᵇ adapted to bear upon the front and inner edge surfaces of the impact bars 1ᵇ and 2, both of which bars are herein shown as in a vertical plane. At the central portion of the plate 5ᵇ there is provided a recess 15 adapted to receive the forward edge of the twisted portion 3ᵇ of the rear bar 3ª. The rear plate 6ᵇ is shown as bent, or cast, to surround the rear edge of a portion of the section 3ᵇ and to bear upon the rear surfaces of the bars 1ᵇ and 2. The bolts 13 and 14, passing through suitable apertures in the plate 6ᵇ and threaded into suitable apertures in the plate 5ᵇ provide means for drawing the clamp plates together.

In Fig. 8 a still further modification is shown in which the impact bars 1ª and 2ª are twisted at their central portion to an angle inclined to the vertical and the rear bar 3ᵇ is twisted to lie in a horizontal plane. The center clamp plates 5ᶜ and 6ᶜ may be of suitable configuration to bear upon the corresponding surfaces of the impact and rear bars and these plates may be drawn together by bolts 13 and 14.

It is apparent that more than two impact bars may be used, which may or may not all be twisted as herein described. It is further apparent that the bars may be offset vertically or horizontally to give the desired ornamental figuration. In the modifications shown in Figs. 5 to 8 such vertically offset impact bars might be utilized to produce a bumper having a narrow central portion which would provide a recess for the reception of the motor crank of the vehicle if the bumper were applied to the front thereof, or a depression to allow the removal of the spare tire if the bumper were applied to the rear of the vehicle.

If it is desired to increase the rigidity of the central portion of an impact bar to the maximum the intermediate portion thereof may be twisted to such an extent that it will lie in a horizontal plane and it is apparent that any intermediate angle may be used.

It is further apparent that by broadening the impact bar at the central twisted portion, to compensate for the decrease of the vertical depth at such twisted portion, each of the bars may be kept constant throughout its length and the width of the bumper may thereby be kept uniform at all points.

It is further apparent that my invention may be applied to bumpers of different types and it is not intended to hereby restrict the scope to the particular embodiment herein shown and described. It is applicable as well to fender guards which, in conjunction with the rear tire, serve to protect the rear portion of the vehicle.

Having thus described my invention, what I claim is:

1. In a vehicle bumper the combination of an impact bar with each of its end portions in substantially a vertical plane and its central portion in a plane inclined to the vertical, and means for supporting said impact bar.

2. In a vehicle bumper the combination of an impact bar having an end portion in a vertical plane and an intermediate portion in a plane inclined to the vertical, and means for supporting said bar.

3. In a vehicle bumper, the combination with a rear bar, of an impact bar having each of its end portions in substantially vertical planes and its middle portion in a plane at an angle to the vertical, and means for connecting the end portions of the impact and rear bars.

4. In a vehicle bumper, the combination with a rear bar, of an impact bar having its end portions in substantially vertical planes and an intermediate portion in a plane at an angle to the vertical, and means for connecting the end portions of the impact and rear bars, said connecting means including an eye at an end of the impact bar, an eye at the end of the rear bar, and a bolt passing through said eyes.

5. A bumper including an impact bar having a portion intermediate its ends in a plane inclined to the vertical and having vertically disposed eyes at its ends, a rear bar having eyes at its ends in alignment with the eyes at the ends of the said impact bar and having its central portion bent forwardly for connection to said impact bar at a point intermediate its ends, means passing through said eyes for attaching the ends of said impact and rear bars and means for clamping the rear and impact bars at their intermediate point of contact.

6. An impact bar for a bumper having vertically disposed eyes at its ends and its middle portion in a plane inclined to the vertical.

7. A bar for a bumper having vertically disposed end portions and a portion intermediate its ends inclined to the vertical.

8. In a vehicle bumper the combination with an impact bar having substantially vertically disposed end portions and an intermediate section at an angle to the vertical, of a rear bar having an intermediate section at an angle to the vertical, and means for connecting said bars.

9. In a vehicle bumper, the combination with an impact bar, of a rear bar having an intermediate section at an angle to the vertical, and means for connecting said bars.

10. In a vehicle bumper, the combination with an impact bar having vertically disposed eyes at its end portions, of a rear bar having vertically disposed eyes at its end portions and an intermediate section at an angle to the vertical, and means passing through said eyes for pivotally connecting the ends of the said bars.

11. A vehicle bumper bar adapted to be supported at its end portions and having a section between said points of support bowed forwardly, said forwardly bowed section having a portion at an angle to the vertical.

12. A vehicle bumper comprising an impact section adapted to be supported at its end portions, and a rear bar adapted to be attached to the end portions of said impact section and having its middle section bowed forwardly for attachment to said impact section, said bowed section having a portion in a plane at an angle to the vertical.

13. A vehicle bumper comprising an impact section having its end portions in substantially vertical planes, and a rear bar adapted to be connected to said end portions and having a section intermediate its ends bowed forwardly for attachment to said impact section, said bowed section having its middle portion in a plane at an angle to the vertical.

14. A vehicle bumper comprising a pair of impact bars having eyes at their ends in vertical alignment, a rear bar having eyes at its ends in alignment with the eyes at the ends of the impact bars, said rear bar having a portion intermediate its ends arched forwardly for attachment to said impact bars, said arched portion having its middle section in a horizontal plane, and means for connecting said impact and rear bars.

15. A vehicle bumper comprising an impact section including a bar having its end portions in vertical planes and an intermediate portion in a plane at an angle to the vertical, a rear bar adapted to be connected to the end portion of said impact section and having a portion bent forwardly for connection to said impact section, said rear bar having its forwardly bent portion at an angle to the vertical, and means for connecting said rear and impact bars.

16. A vehicle bumper bar adapted to be supported at its end portions and having a section between said points of support bowed forwardly, said forwardly bowed section having a portion in a horizontal plane.

17. A vehicle bumper comprising an impact section including a bar having its end portions in vertical planes and an intermediate portion in a plane at an angle to the vertical, a rear bar adapted to be connected to the end portion of said impact section and having a portion bent forwardly for connection to said impact section, said rear bar having its forwardly bent portion in a horizontal plane, and means for connecting said rear and impact bars.

In testimony whereof, I hereunto affix my signature.

HERBERT S. JANDUS.